United States Patent [19]
Horii

[11] Patent Number: 6,046,771
[45] Date of Patent: Apr. 4, 2000

[54] IMAGE SENSING APPARATUS

[75] Inventor: Hiroyuki Horii, Kanagawa-ken, Japan

[73] Assignee: Canon Kabushiki Kaisha, Tokyo, Japan

[21] Appl. No.: 08/438,794

[22] Filed: May 11, 1995

[30] Foreign Application Priority Data

May 20, 1994 [JP] Japan .................................... 6-106774
Apr. 25, 1995 [JP] Japan .................................... 7-101194

[51] Int. Cl.[7] .................................................. H04N 9/64
[52] U.S. Cl. .......................................... 348/243; 348/241
[58] Field of Search ................................. 348/241, 242, 348/243, 244, 248, 249, 250, 270; H04N 9/64

[56] References Cited

U.S. PATENT DOCUMENTS

| | | | |
|---|---|---|---|
| 5,053,873 | 10/1991 | Taniji ........................................ | 348/243 |
| 5,181,118 | 1/1993 | Kimura ..................................... | 348/243 |
| 5,216,511 | 6/1993 | Tani ......................................... | 348/243 |
| 5,293,239 | 3/1994 | Takahashi et al. ....................... | 348/241 |

FOREIGN PATENT DOCUMENTS

| | | | |
|---|---|---|---|
| 2285584 | 12/1987 | Japan ............................. | H04N 5/21 |
| 4109777 | 4/1992 | Japan ........................... | H04N 5/335 |
| 5115026 | 5/1993 | Japan ........................... | H04N 5/217 |
| 5149792 | 6/1993 | Japan ............................. | H04N 5/33 |

OTHER PUBLICATIONS

Patent Abstracts of Japan No. JP62285584, vol. 12, No. 177 (E 613), Dec. 11, 1987.
Patent Abstracts of Japan No. JP4109777, vol. 16, No. 352 (E 1241), Apr. 10, 1992.
Patent Abstracts of Japan No. JP5115026, vol 17, No. 476 (E 1424), May 5, 1993.
Patent Abstracts of Japan No. JP5149792, vol. 17, No. 536 (P 1620), Jun. 15, 1993.
Patent Abstracts of Japan No. JP6054262, vol. 18, No. 286 (E 1556), Feb. 25, 1994.

*Primary Examiner*—Tuan Ho
*Attorney, Agent, or Firm*—Robin, Blecker & Daley

[57] ABSTRACT

An image sensing apparatus includes a photoelectric conversion part arranged to convert image pickup light of an object, a light quantity control member arranged to control a quantity of light incident on the photoelectric conversion part, a first storage part arranged to store an image signal outputted from the photoelectric conversion part, a second storage part arranged to store a noise generated by the photoelectric conversion part, and a control part arranged to cause the noise generated by the photoelectric conversion part while the light incident on the photoelectric conversion part is blocked by the light quantity control member to be stored in the second storage part and to cause the image signal stored in the first storage part to be outputted while the noise is being stored in the second storage part.

16 Claims, 3 Drawing Sheets

IMAGE SENSING APPARATUS

BACKGROUND OF THE INVENTION

1. Field of the Invention

This invention relates to an image sensing apparatus using an image sensor such as a CCD or the like.

2. Description of the Related Art

When an image is picked up by an image sensing apparatus of the kind using an image sensor such as a CCD, a dark current generates a noise from within the image sensor in addition to an image signal generated according to the quantity of incident light. The level of the noise varies according to exposure time, temperature, etc. This noise is a serious cause for deterioration of images picked up. To solve this problem, the image sensor itself has been arranged to lower the dark current. Further, in the case of a still image camera having a shutter mechanism, the camera has been arranged to improve its S/N ratio by storing data of the dark current obtained when the shutter is closed and by subtracting the noise component of the dark current from the image signal obtained by shooting.

However, the conventional camera adapted for picking up motion images is not provided with any shutter mechanism for blocking light. Therefore, it has been hardly possible to improve the S/N ratio of the camera of this kind, because a noise component generated from within the image sensor cannot be detected. Besides, it has been hardly possible to separately take out the noise component because a motion image pickup operation cannot be allowed to have even a momentary pause for this purpose.

SUMMARY OF THE INVENTION

It is an object of this invention to provide an image sensing apparatus which is capable of picking up high quality images with an excellent S/N ratio.

It is another object of this invention to provide an image sensing apparatus which is capable of extracting and removing noises without discontinuance of images even while an image pickup operation is in process.

To attain these objects, an image sensing apparatus which is arranged according to this invention as an embodiment thereof comprises photoelectric conversion means for converting image pickup light of an object into an image signal; light quantity control means for controlling a quantity of light incident on the photoelectric conversion means; first storage means for storing the image signal outputted from the photoelectric conversion means; second storage means for storing a noise generated by the photoelectric conversion means; and control means for causing the noise generated by the photoelectric conversion means while the light incident on the photoelectric conversion means is blocked by the light quantity control means to be stored in the second storage means and for causing the image signal stored in the first storage means to be outputted while the noise is being stored in the second storage means.

The embodiment of this invention arranged as described above is capable of storing the noise without causing any discontinuance of images even while an image pickup operation is in process.

An image sensing apparatus arranged as another embodiment of this invention comprises photoelectric conversion means for converting image pickup light of an object into an image signal; light quantity control means for controlling a quantity of light incident on the photoelectric conversion means; first storage means for storing the image signal outputted from the photoelectric conversion means; second storage means for storing a noise generated by the photoelectric conversion means; arithmetic operation means for removing the noise by performing an arithmetic operation on the image signal obtained by the photoelectric conversion means and the noise stored in the second storage means; and control means for causing the noise generated by the photoelectric conversion means while the light incident on the photoelectric conversion means is blocked by the light quantity control means to be stored in the second storage means and for causing the image signal stored in the first storage means to be outputted while the noise is being stored in the second storage means.

The arrangement mentioned above enables the image sensing apparatus to remove the noise without causing any discontinuance of images even while an image pickup operation is in process.

An image sensing apparatus arranged as a further embodiment of this invention comprises photoelectric conversion means for converting image pickup light of an object into an image signal; light quantity control means for controlling a quantity of light incident on the photoelectric conversion means; first storage means for storing the image signal outputted from the photoelectric conversion means; second storage means for storing a noise generated by the photoelectric conversion means; control means for causing the noise generated by the photoelectric conversion means while the light incident on the photoelectric conversion means is blocked by the light quantity control means to be stored in the second storage means and for causing the image signal stored in the first storage means to be outputted while the noise is being stored in the second storage means; and switching means for switching between a first mode in which a normal image pickup operation is performed and a second mode in which the noise is extracted.

The arrangement enables the image sensing apparatus to be capable of switching to a mode in which the noise can be extracted without causing any discontinuance of images even in process of an image pickup operation.

These and other objects and features of this invention will become apparent from the following detailed description of embodiments thereof taken in conjunction with the accompanying drawings.

DETAILED DESCRIPTION OF THE PREFERRED EMBODIMENTS

Figure 1:
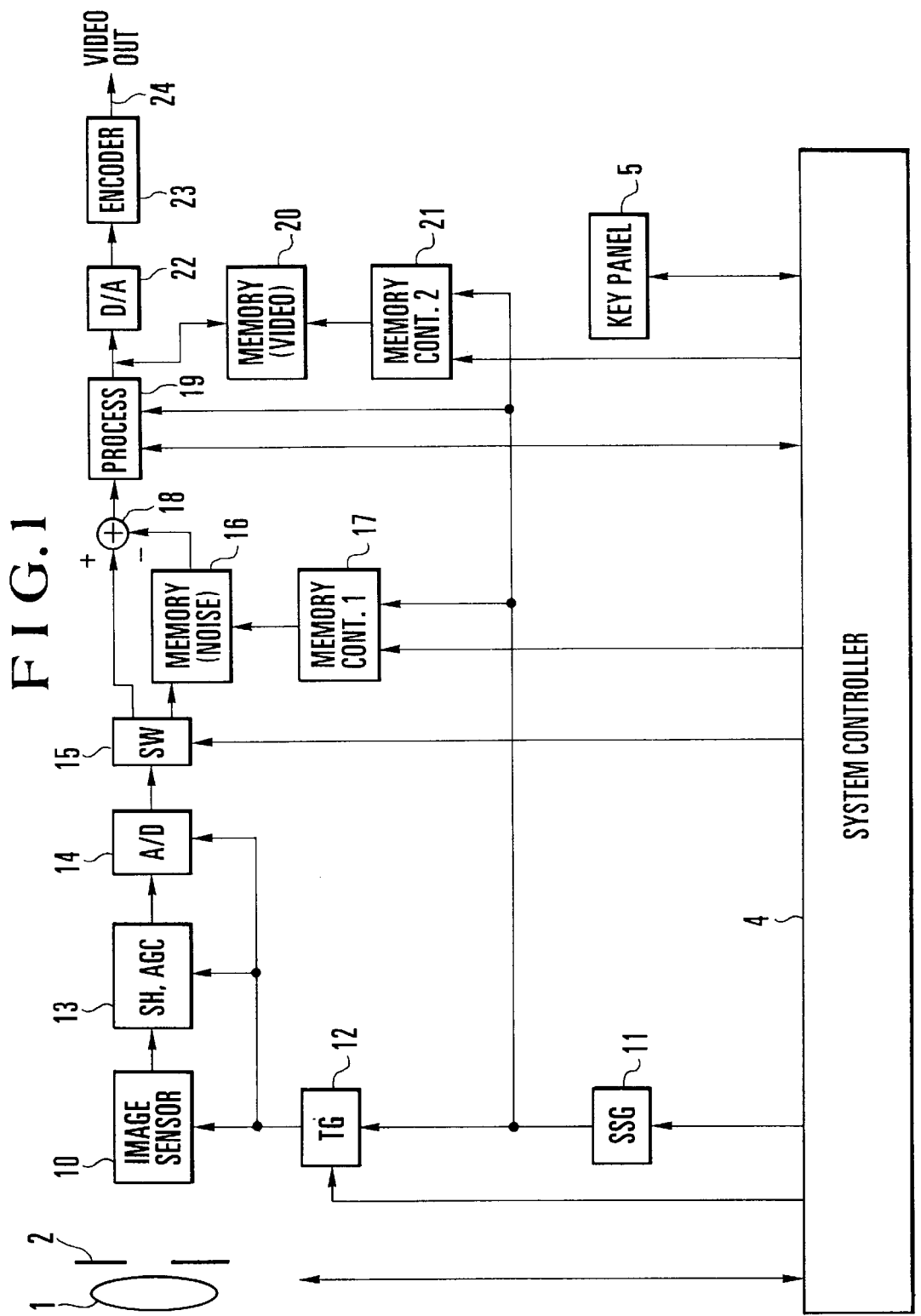
FIG. 1 is a block diagram showing the arrangement of an image sensing apparatus which is an embodiment of this invention.

FIG. 1 shows in a block diagram the arrangement of an image sensing apparatus which is arranged according to this invention as an embodiment of this invention. The apparatus is provided with a lens 1 for picking up images. An iris 2 serving also as a shutter is arranged to adjust the incident quantity of image pickup light coming through the lens 1 (hereinafter referred to as an iris/shutter). A system controller 4 is arranged to control the whole apparatus and also to serve as a control part for control over the iris/shutter 2. A RAM is disposed within the system controller 4. Reference numeral 5 denotes a key panel. An image sensor 10 is arranged to photoelectrically convert the image pickup light. A synchronizing signal generator (SSG) 11 is arranged to output a synchronizing signal. A timing pulse generator (TG) 12 is arranged to output timing pulses for driving the image sensor 10. An SH, AGC circuit 13 is arranged to sample and hold an image signal outputted from the image sensor 10 and to perform an automatic gain control action on the image signal. An A/D converter 14 is arranged to convert an analog signal outputted from the SH, AGC circuit 13 into a digital signal. A switch (SW) 15 is arranged to perform a switching action on the output of the A/D converter 14 under the control of the system controller 4.

A first memory 16 which stores the image signal outputted by the image sensor 10 is arranged, in this case, to serve as a noise memory for storing a noise component of the image signal from the image sensor 10. A first memory controller 17 is arranged to control the noise memory 16. An arithmetic element 18 is arranged to remove the noise component stored in the memory 16 by subtracting the noise component from the image signal outputted by the image sensor 10. A signal processing part 19 is arranged to perform various processes such as color processing action on the image signal. A second memory 20 which stores an image signal is arranged, in this case, to serve as a video memory for storing a video signal obtained through the signal processing actions performed by the signal processing part 19. A second memory controller 21 is arranged to control the memory 20. A D/A converter 22 is arranged to bring the processed video signal back to the form of an analog signal. An encoder 23 is arranged to output the analog converted signal as a video signal 24 in a predetermined format.

The operation of the embodiment is described as follows: The image sensor 10 is a solid-state image sensor, such as a CCD or the like, and is arranged in a shape of a single-plate color sensor formed by sticking a color filter which consists of a mosaic of complementary colors Cy, Mg, Ye and Gr to the surface of a chip. The image sensor 10 is driven by driving pulses generated by the timing pulse generator 12 in accordance with a synchronizing signal outputted from the synchronizing signal generator 11. An image signal outputted from the image sensor 10 is supplied to the SH, AGC circuit 13 to be subjected to sample-and-hold and AGC (automatic gain control) actions, which are carried out to take out a signal component by removing a switching noise. The output of the SH, AGC circuit 13 is supplied to the A/D converter 14 of 10 bits to be converted into digital data.

The image signal converted into the digital data by the A/D converter 14 is supplied to the switch 15 which is composed of a demultiplexer. The switch 15 supplies the digital data either to the memory 16 or the arithmetic element 18. The switch 15 is arranged such that, when a noise component of the image sensor 10 is taken out as a signal by fully closing the iris/shutter 2, the noise component signal is stored in the memory 16. In the case of shooting in a normal state, the image signal is inputted to the arithmetic element 18 and a difference between the image signal and the noise data stored in the memory 16 is obtained.

After the removal of the noise component, the image signal is supplied to the signal processing part 19 to be color-converted into luminance and two-color-difference (YUV) data. At the signal processing part 19, data for automatic white balance adjustment is extracted. The data extracted is supplied to the system controller 4. Upon receipt of the data, the system controller 4 performs a computing operation to set a white balance by setting a gain for each color. Data for automatic focusing and for automatic iris control are also extracted and likewise supplied to the system controller 4 to adjust the position of the lens 1 and that of the iris 2 through computing operations.

The image signal converted into the luminance and two-color-difference (YUV) data is supplied to the D/A converter 22 to be converted to an analog signal. The encoder 23 then modulates the color-difference signal into a chrominance signal, which is outputted as a video signal. The video signal is supplied to the signal processing part 19 to be converted into a luminance and two-color-difference (YUV) signal. The luminance and two-color-difference (YUV) signal is, if necessary, stored in the memory 20 and then is read out and supplied to the D/A converter 22 to be outputted as a video signal.

The operation of the embodiment is described in detail below with reference to the flow chart of FIG. 2.

Figure 2:
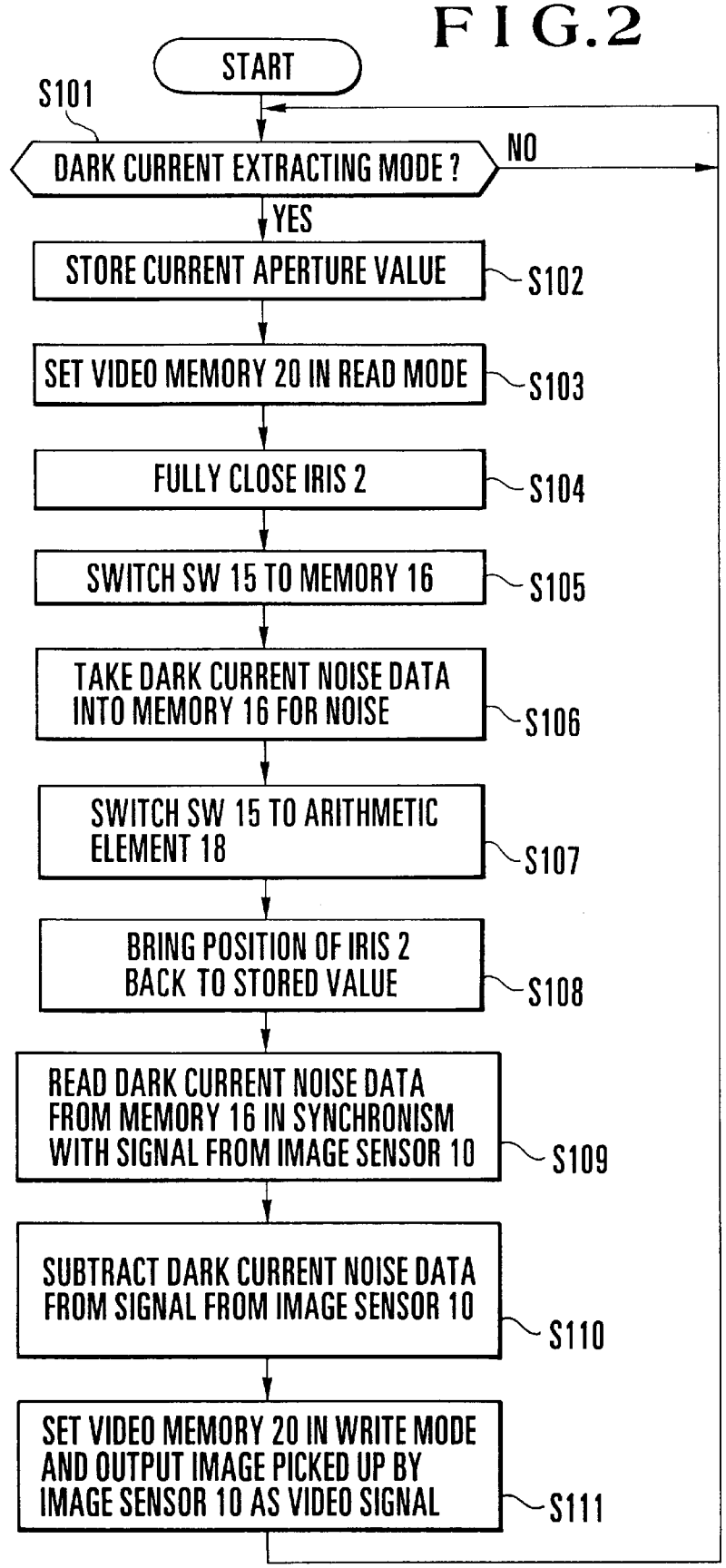
FIG. 2 is a flow chart showing the operation of the image sensing apparatus which is the embodiment of this invention.

Referring to FIG. 2, a check is made at a step S101 for a dark current noise extracting mode. No action is taken if it is not necessary to extract the dark current noise. However, if a manual instruction is given, for example, from the key panel 5 for the dark current noise extracting mode, the flow of operation comes to a step S102 to execute the following sequence of actions:

At the step S102, a current aperture value is first stored in a RAM which is disposed within the system controller 4. At a step S103, the memory 20 for a video signal is set in a read mode. Data of a picture plane stored immediately before entering into the dark current noise extracting mode is read out from the memory 20 and a video signal thus obtained is outputted. At a step S104, the iris/shutter 2 is fully closed. At a step S105, the switch (SW) 15 is shifted to its position on the side of the memory 16 (for the noise) to make the memory 16 ready for taking in dark current noise data. At a step S106, when the light coming to the image sensor 10 is completely shut out, the dark current noise data for a dark current of the image sensor 10 obtained during one frame period is taken into the memory 16 which is provided for the noise.

At a step S107, after completion of taking the dark current noise data for one frame period into the memory 16, the switch 15 is shifted to the other position on the side of the arithmetic element 18. At a step S108, the iris/shutter 2 is opened to a position corresponding to the aperture value stored. At a step S109, the dark current noise data which has been stored just now is read out in synchronism with the operation of the image sensor 10. At a step S110, the dark current noise data stored and read out from the memory 16 is subtracted at the arithmetic element 18 from a signal outputted from the image sensor 10 to obtain a pure picked-up image signal which includes no dark current noise.

At a last step S111, the memory 20 which is provided for a video signal is set into a write mode. An image picked up just now by the image sensor 10 is outputted as the video signal in place of an image which is stored immediately before entering into the dark current noise extracting mode and is outputted from the memory 20 as a video signal. The dark current noise extracting mode then comes to an end and the operation of the embodiment comes back to a normal operation mode.

Further, the embodiment may be arranged to automatically enter into the dark current noise extracting mode according to time, temperature, etc., in addition to entering into the dark current noise extracting mode in response to a manual instruction.

The embodiment has been described as using a single-plate sensor which is provided with a mosaic filter of complementary colors. However, the sensor of course may be arranged to be provided with a pure color filter or a filter consisting of pure and complementary colors instead of the filter of a complementary color mosaic.

Figure 3:
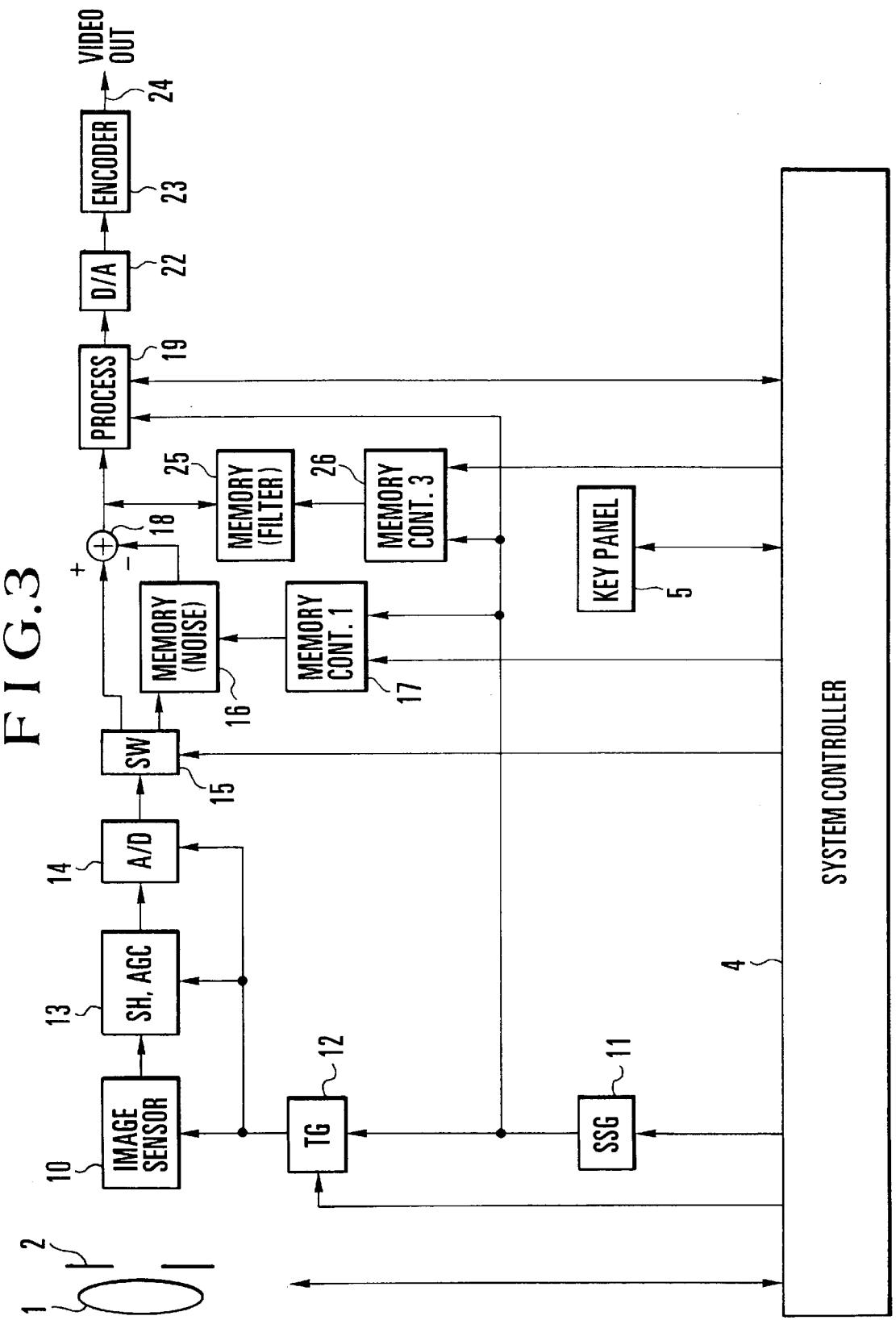
FIG. 3 is a block diagram showing the arrangement of an image sensing apparatus which is another embodiment of this invention.

FIG. 3 shows in a block diagram the arrangement of another embodiment of this invention. In FIG. 3, the component parts which are the same as those shown in FIG. 1 are indicated by the same reference numerals. Referring to FIG. 3, the embodiment includes a filter image memory 25 which is arranged to store data obtained by the image pickup action of the image sensor 10 as it is without carrying out the color conversion processes, etc. There is provided a third memory controller 26 which is arranged to control the filter image memory 25.

In this case, the memory 25 is arranged to store the image signal picked up by the image sensor 10 as it is in a state of a filtered image. In a case where the dark current noise is taken into the memory 16 which is arranged to store data of a dark current noise obtained by fully closing the iris/shutter 2, an image signal stored in the filter image memory 25 is read out and is supplied to the signal processing part 19 for color conversion and the output of the signal processing part 19 is outputted as a video signal through the D/A converter 22 and the encoder 23.

The positions of the memories 20 and 25 which are provided for the purpose of giving a continuous display without any dropout in the above-stated video signal output are not limited to those shown in FIGS. 1 and 3. These memories may be disposed in any other suitable positions.

The embodiment is arranged as described above to be capable of controlling the iris mechanism to cause it to be filly closed, to have the memory 16 arranged to store the dark current noise and to have the arithmetic element 18 arranged to subtract the dark current noise. The data of the dark current noise of the image sensor 10 is stored in the memory 16 and is then read out from the memory 16. A computing operation is performed on the data read out from the memory 16 and the signal from the image sensor 10. This arrangement enables a motion image camera or the like to correct the dark current noise of the image sensor 10 while a shooting operation is in process. The image signal, therefore, can be obtained with an excellent S/N ratio.

Further, by virtue of the memories 20 and 25 arranged to en able a display to be continuously made without any dropout, the picked-up image signal obtained immediately before the iris/shutter 2 is fully closed is stored and the signals can be read out from the memory 20 or 25 to give no unnatural impression to the user when the dark current noise is corrected by fully closing the iris/shutter 2 and by taking the dark current noise into the noise memory 16.

While the embodiment has been described on the assumption that the synchronizing signal generator (SSG) 11 is arranged to generate predetermined synchronizing clock pulses, the arrangement of the synchronizing signal generator (SSG) 11 may be changed as follows:

The synchronizing signal generator 11 may be arranged to be programmable and to have, for example, the widths of horizontal and vertical synchronizing signals, horizontal and vertical driving periods, horizontal and vertical blanking widths and the widths of the front and back porches of the horizontal and vertical synchronizing signals arranged to be variable by varying the value of an internal register of the synchronizing signal generator 11 by the system controller 4.

Further, the image sensor driving timing also can be arranged to be variable by arranging the system controller 4 to be capable of varying the value of an internal register of the timing pulse generator (TG) 12.

With the embodiment arranged in this manner, the operating timing of the whole system can be varied with the image sensor driving timing varied by the control of the system controller 4. Further this arrangement enables the embodiment to lower a noise component resulting from a slow shutter speed at which storage time becomes, for example, longer than 1/60 sec.

In a case where the image sensor 10 has a plurality of operating modes, the operating mode of the image sensor 10 can be changed from one mode over to another by arranging the system controller 4 to vary the values of the internal registers of the synchronizing signal generator 11 and the timing pulse generator 12. Further, with the value of the internal registers of the memory controller 17 and the memory controller 21 or the memory controller 26 also arranged to be variable in the same manner, the operating mode of the whole system can be changed and then the noise component can be offset in each of a plurality of operating modes.

Each of the embodiments described is arranged to perform the signal processing action after the data of the noise component which is caused by the dark current of the image sensor and obtained with the iris/shutter fully closed is stored in a memory. By virtue of the arrangement, the dark current noise of the image sensor can be corrected to give an image signal of an excellent S/N ratio even in the case of an image sensing apparatus for motion images.

Further, since the embodiment is arranged to read out and output an image signal stored in a second memory for a period during which the noise component caused by the noise of the image sensor is stored in a first memory, a display can be continuously made without any dropout in the video signal even while motion images are being picked up.

What is claimed is:

1. An image sensing apparatus comprising
   a) photoelectric conversion means for converting image pickup light of an object into an image signal;
   b) light quantity control means for controlling a quantity of light incident on said photoelectric conversion means;
   c) first storage means for storing the image signal outputted from said photoelectric conversion means;
   d) second storage means for storing a noise generated by said photoelectric conversion means;
   e) third storage means for storing a state of said light quantity control means; and
   f) control means for causing the noise generated by the photoelectric conversion means while the light incident on said photoelectric conversion means is blocked by said light quantity control means to be stored in said second storage means after the state of said light quantity control means is stored in said third storage means.

2. An apparatus according to claim 1, wherein said control means is arranged to store the noise for every predetermined period of time.

3. An apparatus according to claim 1, wherein said control means is arranged to store the noise according to temperature.

4. An apparatus according to claim 1, wherein said light quantity control means is an iris.

5. An apparatus according to claim 4, wherein said control means is arranged to store the noise after an aperture value of said iris is stored in said third storage means.

6. An image sensing apparatus comprising
   a) photoelectric conversion means for converting image pickup light of an object into an image signal;
   b) light quantity control means for controlling a quantity of light incident on said photoelectric conversion means;
   c) first storage means for storing the image signal outputted from said photoelectric conversion means;
   d) second storage means for storing a noise generated by said photoelectric conversion means;
   e) third storage means for storing the state of said light quantity control means;
   f) arithmetic operation means for removing the noise by performing an arithmetic operation on the image signal obtained by said photoelectric conversion means and the noise stored in said second storage means; and
   g) control means for causing the noise generated by said photoelectric conversion means while the light incident on said photoelectric conversion means is blocked by said light quantity control means to be stored in said second storage means after the state of said light quantity control means is stored in said third storage means and for causing the image signal stored in said first storage means to be outputted while the noise is being stored in said second storage means.

7. An apparatus according to claim 6, wherein said arithmetic operation means is arranged to subtract the noise from the image signal.

8. An apparatus according to claim 6, wherein said control means is arranged to store the noise for every predetermined period of time.

9. An apparatus according to claim 6, wherein said control means is arranged to store the noise according to temperature.

10. An apparatus according to claim 6, wherein said light quantity control means is an iris.

11. An apparatus according to claim 10, wherein said control means is arranged to store the noise after an aperture value of said iris is stored in said third storage means.

12. An image sensing apparatus comprising
   a) photoelectric conversion means for converting image pickup light of an object into an image signal;
   b) light quantity control means for controlling a quantity of light incident on said photoelectric conversion means;
   c) storage means for storing a noise generated by said photoelectric conversion means;
   d) noise extracting means for causing the noise generated by said photoelectric conversion means while the light incident on said photoelectric conversion means is blocked by said light quantity control means to be stored in said storage means; and
   e) switching means for switching between a first mode in which an image pickup operation of the object is performed by said photoelectric conversion means while the light quantity control is performed by said light quantity control means and a second mode in which the noise is extracted by said noise extracting means.

13. An apparatus according to claim 12, wherein said switching means is arranged to switch said first and second modes for every predetermined period of time.

14. An apparatus according to claim 12, wherein said switching means is arranged to switch said first and second modes according to temperature.

15. An apparatus according to claim 12, wherein said light quantity control means is an iris.

16. An apparatus according to claim 15, wherein said control means is arranged to detect the noise after an aperture value of said iris is stored.

\* \* \* \* \*

UNITED STATES PATENT AND TRADEMARK OFFICE
CERTIFICATE OF CORRECTION

PATENT NO. : 6,046,771
DATED : April 4, 2000
INVENTOR(S) : Hiroyuki Horii

It is certified that error appears in the above-identified patent and that said Letters Patent are hereby corrected as shown below:

Col. 3, line 12, delete "a n" and insert --an--.
Col. 3, line 35, delete ":" and insert --.--.
Col. 4, line 25, delete ":" and insert --.--
Col. 5, line 5, after "instead" insert --of--.
Col. 5, line 58, delete ":" and insert --.--

Signed and Sealed this

Seventeenth Day of April, 2001

Attest:

NICHOLAS P. GODICI

Attesting Officer

Acting Director of the United States Patent and Trademark Office